Figure 1:
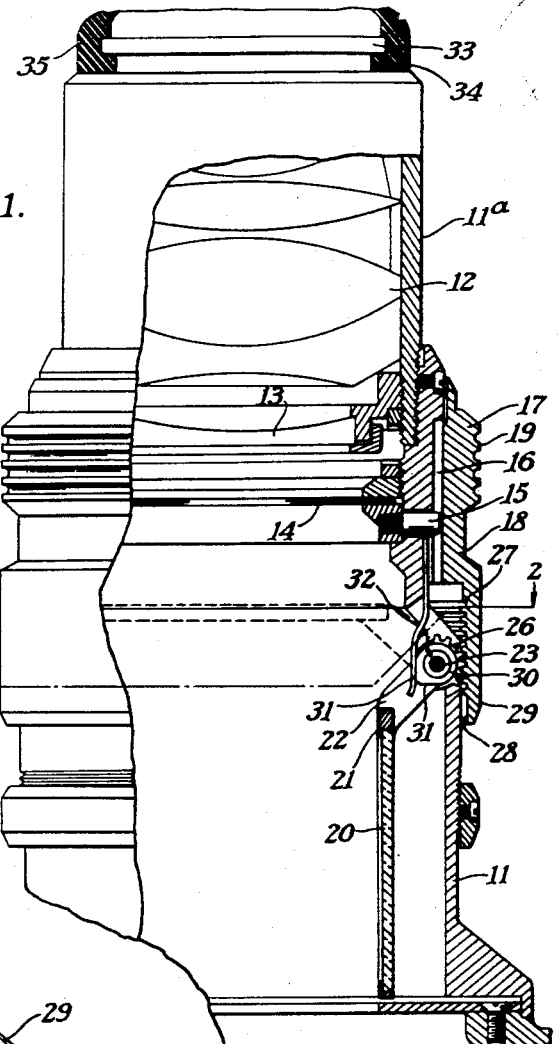

March 20, 1945.                J. H. EAGLE                2,371,744
                    EYEPIECE FILTER AND DIAPHRAGM CONTROL
                           Filed Aug. 21, 1943

JOHN H. EAGLE
INVENTOR
BY
ATTORNEYS

Patented Mar. 20, 1945

2,371,744

UNITED STATES PATENT OFFICE 2,371,744

EYEPIECE FILTER AND DIAPHRAGM CONTROL

John H. Eagle, Rochester, N. Y., assignor to Eastman Kodak Company, Rochester, N. Y., a corporation of New Jersey Application August 21, 1943, Serial No. 499,465

9 Claims. (Cl. 88—1)

The present invention relates to optical devices, and more particularly to an eyepiece filter and diaphragm control for use on fire-control instruments.

One object of the invention is the provision of a light filter and an adjustable diaphragm which are connected to and controlled by a single member.

Another object of the invention is the provision of a control member which permits either independent or simultaneous control of the filter and diaphragm.

Still another object of the invention is the provision of a control member which is so connected to the diaphragm that rotation of the member will adjust the diaphragm, and so connects to the filter that sliding or axial movement of the member will move the filter into and out of the field of view.

Yet another object of the invention is a control for the diaphragm and filter which is simple, positive, easy to operate, and highly effective in use.

To these and other ends the invention resides in certain improvements and combination of parts, all as will be hereinafter more fully described, the novel features being pointed out in the claims at the end of the specification.

Figure 2:
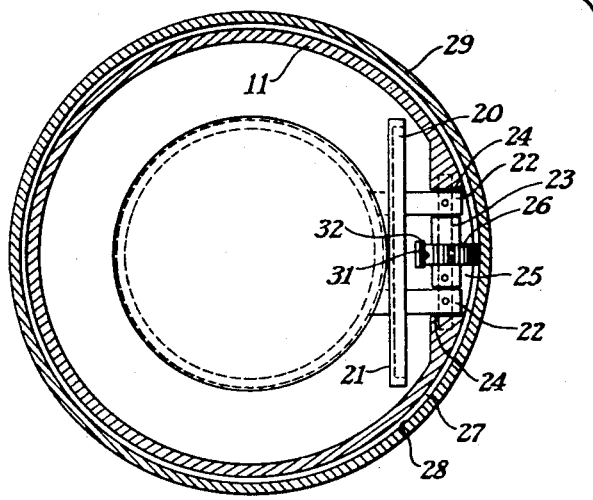

In the drawing:

Fig. 1 is a plain view of an eyepiece of a fire-control instrument, with parts in section, showing the diaphragm and filter control member constructed in accordance with the present invention; and Fig. 2 is a transverse sectional view taken substantially on line 2—2 of Fig. 1.

Similar reference numerals throughout the various views indicate the same parts.

The present invention is embodied in the present instance, by way of illustration only, in an eyepiece filter and diaphragm control for use on fire-control instruments, such as those used in sighting a machine gun on an airplane or other target. As is well known, when an airplane is attacking a target, the pilot endeavors, if possible, to position his plane between the sun and the defending forces so that the observers and gunners of such forces must look toward, and, in some cases, directly into the sun, the disadvantages of which are obvious. In order that the observer or sighter can see the plane more clearly, it is desirable or necessary to cut down the field of view and thus restrict the light. This can be accomplished by means of a diaphragm of the iris type, the aperture of which may be reduced to the desired size. Such a diaphragm is preferably positioned near the reticle or in the focal plane of the lens element of the eyepiece so that the limiting edge of the diaphragm will appear sharp. If the light is still too intense, a suitable filter may be positioned in the field of view, thus materially cutting down the light intensity or brightness of the image to enable the observer to clearly see the airplane or other target on which the guns are trained.

Obviously, the adjustment of the diaphragm and the positioning of the filter may be separately performed, but in order to simplify and expedite such adjustment and positioning, these members are preferably so connected that they may be operated from a single point. To this end, the present invention provides a single control member which when moved in one direction adjusts the diaphragm, and when moved in another direction positions the filter. Such adjusting and positioning may be accomplished independently or simultaneously.

Referring now to the drawing, Fig. 1 shows an eyepiece of a fire-control instrument comprising a barrel member or mount 11 adapted to receive a lens barrel 11a in which are positioned various lens elements 12 and a reticle 13. The members 11 and 11a provide a unitary structure and may be considered as a single member or mount. A diaphragm 14 of the iris type is positioned in the mount 11 adjacent the reticle or in the focal plane of the lens elements 12. As the diaphragm is of the well-known construction, further details are not deemed necessary. Suffice it to say that the movable ring of the diaphragm is supplied with a radially projecting pin 15 which extends into an axially extending slot 16 formed in the portion 17 of a diaphragm operating member in the form of a sleeve 18. The portion 17 of the sleeve 18 is provided with a knurled finger-gripping section 19 by which the sleeve may be actuated. As will be readily apparent, the rotation of sleeve 18 will cause a rotative movement of pin 15 to move the diaphragm to adjust the aperture thereof, in a manner well known to those in the art. Thus movement of the sleeve 18 in one direction, rotation, serves to adjust the diaphragm to vary the size of the aperture thereof.

Sleeve 18 is, however, also utilized to move a filter 20 into and out of the field of view of the lens elements 12 and the reticle 13. To secure this result, the filter 20 is mounted in a suitable frame 21 positioned in the barrel 11 and has one edge provided with a pair of space arms 22 adapted to engage shaft 23, see Fig. 2, journalled in the opposite sides 24 of a slot 25 formed in the mount 11. It will be apparent from an inspection of Fig. 1 that rotation of the shaft 23 in a clockwise direction will move the filter 20 from its inoperative position, shown in full lines, to its operative position in the field of view of the eyepiece, as shown in dotted lines. Rotation of shaft 23 in a counterclockwise direction, however, will then return the filter to its inoperative position, shown in full lines. The rotation of shaft 23 to position the filter may be controlled separately from the control of the diaphragm. It is preferred, however, to operatively connect the shaft 23 to the sleeve 18 so that the latter may be utilized to both adjust the diaphragm and to position the filter.

To secure this result, the shaft 23 has secured thereto a pinion or gear 26 adapted to engage teeth 27 formed on the inner surface 28 of the portion 29 of the sleeve 18. The teeth 27 provide in effect a rack which, upon axial or sliding movement of sleeve 18, will rotate the gear 26 and hence the shaft 23 to position the filter 20. The teeth 27 may extend all the way around the inner surface of the portion 29, but at least as far around as the angle of movement of the sleeve 18 in adjusting the diaphragm. Such sliding movement of sleeve 18 is rendered possible by reason of the pin and slot connection formed by the pin 15 and elongated slot 16, as clearly shown in Fig. 1. Thus the axial or sliding movement of sleeve 18 will rotate the shaft 23, by reason of the rack and pinion connection 27 and 26, to position the filter 20. The shaft 23 carries a member 30 having a pair of flats 31 selectively engaged by a spring 32 to retain the filter in either positions of adjustment, as will be apparent from inspection of Fig. 1.

By means of this arrangement, the diaphragm 14 and the filter 20 are both operatively connected to the sleeve 18 so that the latter may be utilized to control both members. Movement of sleeve 18 in one direction, rotation, will adjust the diaphragm, while movement of the sleeve in another direction, sliding or axial, will position the filter. It is apparent that movement of the diaphragm or sleeve may be performed independently or they may be controlled simultaneously by giving the sleeve both a rotary and a sliding movement. Thus a single easily accessible control is provided for both the diaphragm and the filter, the advantage of which will be readily apparent.

The upper end of the mount 11, as viewed in Fig. 1, is supplied with a ring 33 formed with a groove 34 adapted to receive a rubber eye shield 35, only a portion of which is shown. This rubber eye shield serves to protect the eye of the observer against injuries from striking against the end of the mount 11.

It will be apparent from the above description that the present invention provides a single control member by which the diaphragm may be adjusted and the filter positioned. This control member permits either the independent adjustment of the diaphragm and the positioning of the filter or the simultaneous control of these members. Thus the mere rotation of sleeve 18 adjusts the diaphragm, or the mere sliding of the sleeve positions the filter. However, a combined rotation and sliding movement will control both the diaphragm and the filter, all of which will be readily apparent.

While one embodiment of the invention has been disclosed, it is to be understood that the inventive idea may be carried out any number of ways. This application is, therefore, not to be limited to the precise details described, but is intended to cover all variations and modifications thereof falling within the scope of the appended claims.

I claim:

1. In an optical device, the combination with a mount, optical elements positioned in said mount, a variable opening diaphragm carried by said mount and positioned in the path of the light rays passing through said elements to control the field of view therethrough, of a second light transmitting optical element movably supported in said mount independently of said diaphragm and positionable in and out of said field of view, and a control member connected both to said diaphragm and to said second optical member and movable in one direction to adjust said diaphragm to vary the opening thereof and movable in another direction to position said second element.

2. In an optical device, the combination with a mount, optical elements positioned in said mount, a variable opening diaphragm carried by said mount and positioned in the path of the light rays passing through said elements to control the field of view therethrough, of a second light transmitting optical element movably supported in said mount independently of said diaphragm and positionable in and out of said field of view, and a control member mounted on said mount and having one portion operatively connected to said diaphragm and another portion connected to said second element, said control member being movable in one direction to adjust said diaphragm to vary the opening thereof and movable in another direction to position said second element.

3. In an optical device, the combination with a mount, optical elements positioned in said mount, a variable opening diaphragm carried by said mount and positioned in the path of the light rays passing through said elements to control the field of view therethrough, of a second light transmitting optical element movably supported in said mount independently of said diaphragm and positionable in and out of said field of view, and a control member connected both to said diaphragm and to said second control optical member and movable to independently adjust said diaphragm to vary the opening thereof and to position said second element.

4. In an optical device, the combination with a mount, optical elements positioned in said mount, a variable opening diaphragm carried by said mount and positioned in the path of the light rays passing through said elements to control the field of view therethrough, of a second light transmitting optical element movably supported in said mount independently of said diaphragm and positionable in and out of said field of view, and a control member connected both to said diaphragm and to said second optical member and movable to simultaneously adjust said diaphragm to vary the opening thereof and to position said second element.

5. In an optical device, the combination with a mount, optical elements positioned in said mount, a variable opening diaphragm carried by said mount and positioned in the path of the light rays passing through said elements to control the field of view therethrough, of a light filter movably and independently supported in said mount and positionable in and out of said field of view, and a sleeve member movably positioned on said mount and connected to said diaphragm and said filter so that movement of the sleeve in one direction adjusts said diaphragm to vary the opening thereof and movement of the sleeve in another direction positions said filter.

6. In an optical device, the combination with a mount, optical elements positioned in said mount, a variable opening diaphragm carried by said mount and positioned in the path of the light rays passing through said elements to control the field of view therethrough, of a light filter movably supported in said mount and positionable in and out of said field of view, a sleeve member movably positioned on said mount, means for connecting said sleeve to said diaphragm so that movement of said sleeve in one direction will adjust said diaphragm to vary the opening thereof, and separate means for connecting said filter to said sleeve so that movement of the latter in other direction will position said filter.

7. In an optical device, the combination with a mount, optical elements positioned in said mount, an adjustable diaphragm carried by said mount and positioned in the path of the light rays passing through said elements to control the field of view therethrough, of a light filter pivotally supported on said mount and adapted to be moved into and out of said field of view, a sleeve member movably carried by said mount, means for connecting a portion of said sleeve to said diaphragm so that movement of said sleeve in one direction on said mount will adjust said diaphragm, and means including a rack and pinion for connecting said filter to another portion of said sleeve so that movement of the latter in another direction on said mount will position said filter.

8. In an optical device, the combination with a mount, optical elements positioned in said mount, an adjustable diaphragm carried by said mount and positioned in the path of the light rays passing through said elements to control the field of view therethrough, of a light filter positioned in said mount and adapted to be moved into and out of said field of view, a shaft for swingably mounting said filter on said mount, a sleeve carried by said mount and rotatable and slidable thereon, means for connecting said sleeve to said diaphragm so that rotation of said sleeve will adjust said diaphragm, a gear carried by said shaft, and a rack formed on said sleeve and engaging said gear so that sliding of said sleeve will rotate said shaft and gear to move said filter.

9. In an optical device, the combination with a mount, optical elements positioned in said mount, an adjustable diaphragm carried by said mount and positioned in the path of the light rays passing through said elements to control the field of view therethrough, of a light filter positioned in said mount and adapted to be moved into and out of said field of view, a shaft for swingably mounting said filter on said mount, a sleeve carried by said mount and rotatable and slidable thereon, means for connecting said sleeve to said diaphragm so that rotation of said sleeve will adjust said diaphragm, a gear carried by said shaft, a rack formed on said sleeve and engaging said gear so that sliding of sleeve will rotate said shaft and gear to move said filter, and means for releasably retaining said filter in adjusted position.

JOHN H. EAGLE.